March 14, 1967 — J. M. BAILEY — 3,308,794
ENGINE FUEL SYSTEM
Filed Dec. 21, 1964

INVENTOR.
JOHN M. BAILEY
BY
Fryer and Ginwold
ATTORNEYS

United States Patent Office 3,308,794
Patented Mar. 14, 1967

3,308,794
ENGINE FUEL SYSTEM
John M. Bailey, East Peoria, Ill., assignor to Caterpillar Tractor Co., Peoria, Ill., a corporation of California
Filed Dec. 21, 1964, Ser. No. 419,986
4 Claims. (Cl. 123—30)

This invention relates to engine fuel systems and particularly to a fuel system for a compression ignition engine which may be required to burn different kinds of fuel.

Military specifications for engines often require that they be capable of operating on a wide variety of fuels for tactical purposes and in emergencies. Compression ignition type engines are best adapted to multi-fuel operation but difficulties arise with fuels of low cetane rating. The cetane number of a fuel is an indication of its ability to ignite under compression and gasoline with a very low cetane rating is extremely difficult to ignite by compression. On the other hand, fuel oils and lubricating oils have high cetane ratings. It is impractical and undesirable to build engines with sufficiently high compression ratio to insure ignition by compression of gasoline under all operating conditions. Since gasoline is frequently available in abundance as compared to other fuels, the desirability of including it as a fuel for military purposes is evident.

It has been recognized that the addition of even a small quantity of fuel of relatively high cetane number added to gasoline fuel greatly improves its performance in a compression ignition engine. However even a small quantity of oil added continuously over long periods of operation requires that a large stock of oil be available.

Tests leading to the conception of the present invention have shown that low cetane rated fuels result in satisfactory operation of low compression ratio engines under some operating conditions. For example a turbocharged engine of the precombustion chamber type with low compression ratio operates satisfactorily on low cetane fuel at low speeds, for example 1,000 r.p.m. and lower. It also operates well at high speed except in the event of low manifold pressure, say five inches Hg gauge.

It is therefore the object of the present invention to provide an engine fuel system with improved means for injecting small quantities of a secondary fuel with the regular fuel and to provide means for introducing the secondary fuel only under certain operating conditions.

It is a further object of the invention to provide means for introducing a small quantity of secondary fuel into the primary fuel supply at a point proximate to the injection of fuel into the engine combustion space.

Further objects and advantages of the invention and the manner in which it is carried into practice are set forth in the following specification wherein the invention is described in further detail by reference to the accompanying drawing.

Figure 1:
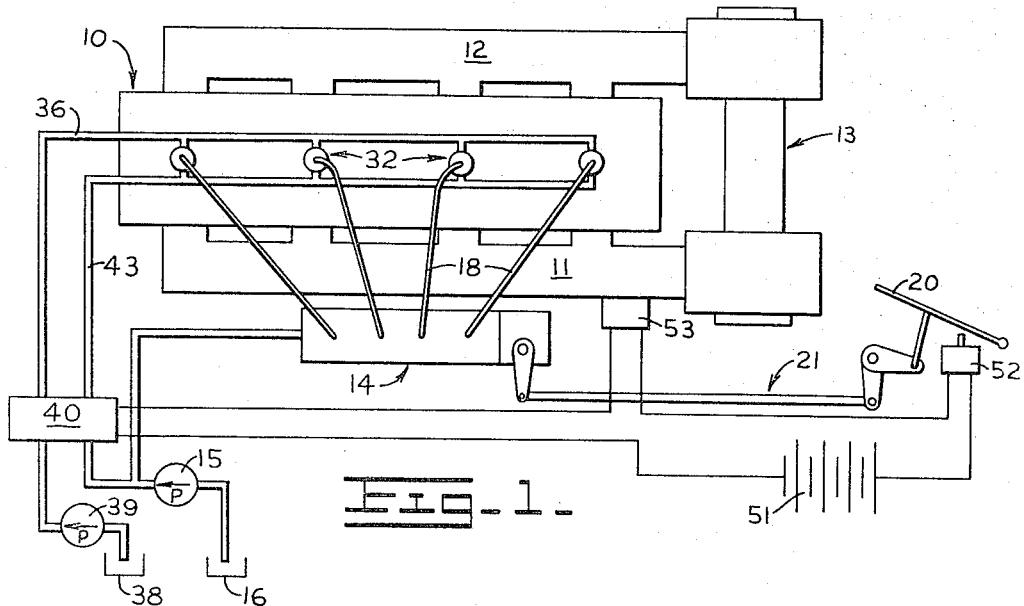
FIG. 1 is a schematic plan view of an engine and fuel system therefor embodying the present invention.

Referring first to FIG. 1 of the drawing, an engine is generally indicated at 10 as having an intake manifold 11 and an exhaust manifold 12. The engine also has a turbo-charger generally indicated at 13. A combined fuel pump and governor housing is shown at 14 and a fuel transfer pump 15 delivers fuel from a tank such as indicated at 16 to the fuel pump housing wherein individual fuel pumps direct the fuel under pressure through lines 18 to the several combustion chambers of the engine. The quantity of fuel injected upon each stroke is controlled by a governor (not shown) in the housing 14, the setting of which may be changed as by a foot pedal 20 and connecting linkage shown at 21.

Figure 2:
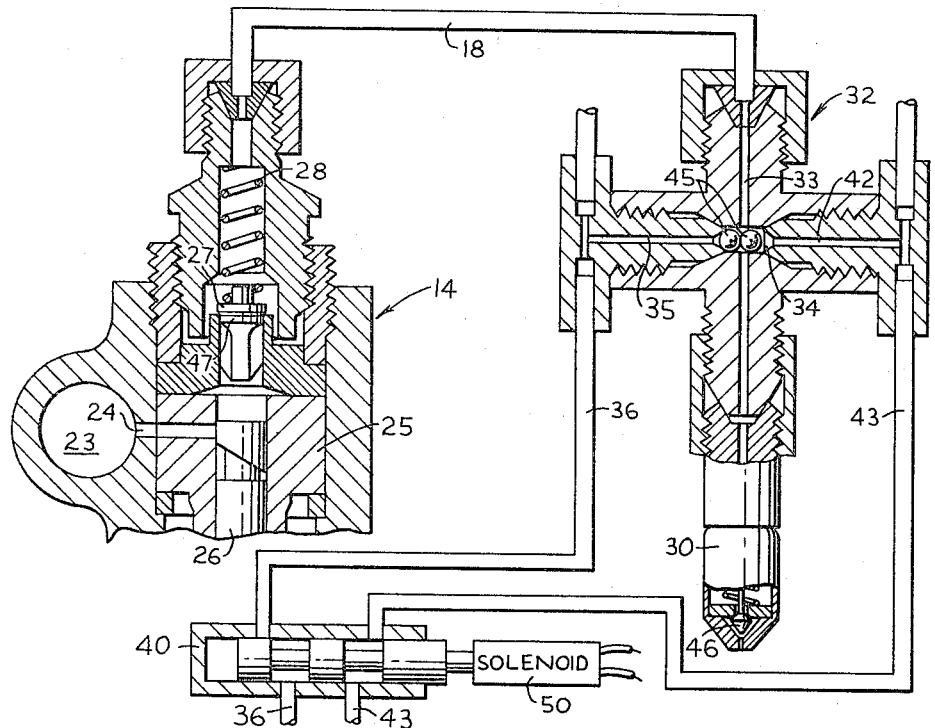
FIG. 2 is a schematic view illustrating a portion of a fuel pump and showing an injection nozzle and mechanism of the present invention associated with the pump and nozzle for introducing small quantities of a secondary fuel into the regular fuel of an engine.

The injection system is shown in greater detail in FIG. 2 wherein the pump housing 14 is shown as having a manifold 23 to which fuel is delivered by the transfer pump 15. A passage 24 communicates between the manifold and the pump cylinder 25 in which a plunger 26 is reciprocated by cam action in a well known manner. As the plunger is reciprocated, fuel is compressed in the cylinder and injected through a check valve 27 normally closed by a spring 28. This pressurizes the fuel in the line 18 which leads to an injection nozzle 30. The injection nozzle is disposed within the combustion space of the engine where the fuel is ignited by compression.

The present invention provides a mixing valve, generally indicated at 32, for introducing small quantities of a secondary fuel with high cetane rating when it is required by engine operating conditions. This mixing valve comprises a cross shaped body having a passage 33 connecting the line 18 with the injection nozzle 30 and intercepting a valve chamber 34. The valve chamber communicates with a passage 35 and manifold 36 (see also FIG. 1) which communicates between mixing valves 32 associated with each of the injection nozzles and with a source of supply of a suitable secondary fuel which may be lubricating oil in the engine sump represented at 38 in FIG. 1. Fuel from this supply is delivered to the mixing valves by a pump 39 and under control of a valve 40 which may be, as illustrated in FIG. 2, a spool-type valve. The mixing chamber also has a passage 42 for communication between the chamber 34 and a manifold 43 which communicates with all of the mixing valves and the fuel tank 16 so that the manifold is pressurized by fuel transfer pump 15. This line 43 is also under control of the spool valve 40. Communication between the valve chamber 34 in the mixing valve and the manifolds 36 and 43 is normally closed by check balls 45 because the pressure in the line 18 is normally greater than the pressure delivered to the manifold by either of the pumps 15 or 39.

In order to introduce a small quantity of secondary oil from the manifold 36 into the passage leading to the injection nozzle 30, a momentary condition of low pressure is created in the line 18 once for each stroke of the plunger 26. This is accomplished by providing what is known as a skirt on the check valve 27. This skirt is in the form of a solid cylindrical portion 47, adjacent the conventional tapered valve seat, which slidably fits the bore in which the valve is disposed. As a consequence, the valve opens under pump pressure only after the skirt leaves the bore and, upon return of the valve under influence of spring 28, closing takes place when the skirt enters the bore. Further movement of the valve until its tapered portion seats slightly increases the space or volumetric capacity of the enclosure which includes the line 18 and all of the space between the valve and the injection nozzle 30. The orifice of the injection nozzle is also closed by a spring closed check valve 46 in accordance with conventional practice. Thus a momentary pressure drop takes place in this otherwise highly pesssurized space and one or the other of the balls 45 will, upon leaving its seat, permit inflow of fuel from either the manifold 36 or the manifold 43. This type of skirted check valve has previously been used to cause a slight pressure drop after each injection stroke of the plunger to prevent dribbling of fuel caused by residual pressure behind the valve in the nozzle. However in the present case the skirt on the valve is slightly longer than that previously used and produces sufficient cavitation to induce flow through the mixing valve.

As illustrated in FIG. 2, the manifold 36 which supplies the secondary fuel of high cetane rating is shown as closed by the spool valve 40 and a solenoid 50 is shown for actuating this valve. As shown in FIG. 1, the solenoid actuated valve 40 is included in the circuit which includes a battery 51 and two switches 52 and 53 in series. The switch 52 is disposed for actuation by the governor control pedal 20 at a point where the pedal has been depressed to cause engine operation at a speed of say 1,000 r.p.m. at which ignition failure might be expected with the low cetane fuel. However since ignition failure is not expected except in the event of low intake manifold pressure, the switch 53 is pressure actuated to an open position and closes only upon reduction of pressure in the intake manifold to a point usually accompanied by ignition failure, such for example as 5" Hg gauge. Thus with both the speed and low pressure conditions prevailing which tend to provoke ignition failure, both switches are closed and the solenoid 50 is actuated to communicate pressure to the manifold 36 and thus permit introduction to the fuel system of a small quantity of high cetane fuel for each stroke of the pump plunger.

During normal operation when ignition failure is not expected, the manifold 43 is pressurized because of the normal position of the valve 40 shown in FIG. 2 and the momentary low pressure condition between the fuel pump and the injection nozzle simply causes the introduction of a small quantity of the low cetane fuel upon which the engine is operating.

It is possible to eliminate that portion of the mixing valve which introduces the low cetane fuel however the construction shown is preferred because it insures that the volume and pressure of fluid between the check valve 27 and the valve in the nozzle 30 is the same for each injection stroke of the plunger. This insures uniform timing and smoother engine operation.

The configuration of the mixing valve is exaggerated in the drawing because the actual clearances are quite small. In practice the balls do not leave their seats more than about .03 inch. The position of the parts as shown in FIG. 2 is with the pump plunger approaching bottom dead center. Valve 27 has closed causing unseating of ball 45 to admit low cetane fuel. The ball is reseated as the plunger commences its upward or pressure stroke.

I claim:
1. A fuel system for a multi-cylinder engine having pump means for a primary fuel, a conduit from the pump means to each cylinder, a source of secondary fuel under pressure lower than pressure delivered by said pump means, passage means communicating secondary fuel from the source to each of said conduits, and check valve means in each said passage means to admit secondary fuel to the conduits only at spaced intervals of low pressure of primary fuel in the conduits.

2. The combination of claim 1 with a source of primary fuel under pressure lower than that delivered by the pump, passage means communicating such low pressure primary fuel from its source to each of said conduits, and check valve means in each said last named passage means to admit low pressure primary fuel to the conduits only at spaced intervals of low pressure of primary fuel from the pump means.

3. The combination of claim 2 with valve means controlling flow selectively of the low pressure primary and secondary fuels.

4. The combination of claim 3 in which the two check valves for low pressure fuels for each conduit comprise two ball checks in opposite sides of a single chamber which intersects the path of flow of fuel from said conduits.

References Cited by the Examiner
UNITED STATES PATENTS

| | | | |
|---|---|---|---|
| 2,758,584 | 8/1956 | Hogeman et al. | 123—140.3 |
| 2,865,355 | 12/1958 | Hilton | 123—139 |
| 2,940,435 | 6/1960 | Nemec et al. | 123—139 |
| 2,947,291 | 8/1960 | Klinge | 123—139 |

MARK NEWMAN, *Primary Examiner.*

LAURENCE M. GOODRIDGE, *Examiner.*